United States Patent [19]
Heacock

[11] Patent Number: 5,837,325
[45] Date of Patent: Nov. 17, 1998

[54] METHOD AND APPARATUS FOR REGULATING NEUTRALIZATION OF CONTAMINATED SOIL

[76] Inventor: Gary E. Heacock, 12807 Marimba Trail, Austin, Tex. 78729

[21] Appl. No.: 640,555

[22] Filed: May 1, 1996

Related U.S. Application Data

[63] Continuation-in-part of Ser. No. 502,500, Jul. 14, 1995.

[51] Int. Cl.⁶ ................................ B05D 1/02; B09B 1/08
[52] U.S. Cl. .............................. 427/421; 427/8; 405/128; 405/129; 405/263; 405/258; 588/249; 588/251; 588/252; 588/257
[58] Field of Search ....................... 427/421, 8; 405/128, 405/129, 263, 258; 588/249, 252, 251, 257

[56] References Cited

U.S. PATENT DOCUMENTS

| | | | |
|---|---|---|---|
| 3,304,964 | 2/1967 | Rose | 141/68 |
| 3,322,219 | 5/1967 | Van Pernis | 177/114 |
| 4,302,488 | 11/1981 | Lowi, Jr. | 427/212 |
| 4,460,292 | 7/1984 | Durham et al. | 405/129 |
| 4,687,373 | 8/1987 | Falk et al. | 405/128 |
| 4,688,610 | 8/1987 | Campbell | 141/83 |
| 4,696,329 | 9/1987 | Izzi | 141/1 |
| 4,738,289 | 4/1988 | von Bennigsen-Mackiewicz et al. | 141/67 |
| 4,782,625 | 11/1988 | Gerken et al. | 47/1.42 |
| 4,821,782 | 4/1989 | Hyer | 141/83 |
| 4,859,367 | 8/1989 | Davidovits | 252/628 |
| 4,867,258 | 9/1989 | Narukawa et al. | 177/116 |
| 4,927,293 | 5/1990 | Campbell | 405/128 |
| 4,952,242 | 8/1990 | Earp | 106/709 |
| 5,035,537 | 7/1991 | Rose | 405/128 |
| 5,039,415 | 8/1991 | Smith | 210/611 |
| 5,061,119 | 10/1991 | Balthaus et al. | 405/128 |
| 5,121,775 | 6/1992 | McClain | 141/83 |
| 5,184,917 | 2/1993 | Rez | 405/128 |
| 5,188,041 | 2/1993 | Noland et al. | 110/246 |
| 5,200,033 | 4/1993 | Weitzman | 159/47.1 |
| 5,295,761 | 3/1994 | Heacock et al. | 405/128 |
| 5,423,455 | 6/1995 | Ricciardi et al. | 222/1 |

*Primary Examiner*—Shrive Beck
*Assistant Examiner*—Bret Chen
*Attorney, Agent, or Firm*—Richard C. Litman

[57] ABSTRACT

A method and apparatus for regulating treatment of contaminated soil may be accomplished by regulating a soil volume rate and a neutralizing agent volume rate to insure proper application of the neutralizing agent to the contaminated soil. Control circuitry regulates the soil volume rate and the neutralizing agent volume rate, based on a soil/neutralizing agent ratio, to insure that the appropriate amount of neutralizing agent is applied to the contaminated soil.

4 Claims, 3 Drawing Sheets

METHOD AND APPARATUS FOR REGULATING NEUTRALIZATION OF CONTAMINATED SOIL

TECHNICAL FIELD OF THE INVENTION

This is a continuation-in-part of co-pending patent application Ser. No. 08/502,500 entitled METHOD AND APPARATUS FOR REMEDIATING CONTAMINATED SOIL filed Jul. 14, 1995.

This invention relates generally to controlling environmental pollutants and, more particularly, to a method and apparatus for decontaminating soil.

BACKGROUND OF THE INVENTION

The industrialization of the United States and other parts of the world has produced astonishing technical advances in transportation, communication, education, etc. These technical advances have not come without costs, however. One such cost is the polluting of our air, water, and soil.

As is known, the soil can be contaminated by a variety of sources in a variety of ways. For example, storage of gasoline in underground tanks by gasoline stations pollutes the soil as the tanks age and subsequently leak. Once an underground tank leaks, the tank must be replaced the and contaminated soil remediated.

One method for the remediation of contaminated soil simply involves removing the contaminated soil from one location and moving it to another location, such as a hazardous waste landfill site. At the landfill site, the contaminated soil may be isolated to prevent contamination of other non-contaminated soils. Removal as a remediation procedure is problematic. It is economically expensive, and there is a limit to space available at landfill sites for isolation of the contaminated soil. Various federal and state governmental and other restrictions require that certain contaminations in soil be treated in particular ways. For example, some contaminated soil cannot be deposited in landfills without pre-treatment. Government regulations may also require that soils having a high level of certain types of contaminants be treated to bring toxicity within acceptable limits before dumping in a landfill. Other restrictions and limits to landfill disposal of contaminated soil may apply.

Another method for remediation of contaminated soil is disclosed in U.S. Pat. No. 5,295,761. In this U.S. patent, the remediation of contaminated soil is done by reducing the contaminated soil to finely divided particles. Once this has been done, a controlled amount of a selective liquid additive is sprayed onto the contaminated soil particles. The liquid additive consists essentially of an aqueous solution of sodium silicate, ethylene glycol, and sodium methyl silanolate. Once the liquid additive has been applied to the soil, the soil is aerated such that the treated soil can be safely discharged into the environment. While this technique provides a means for on-site treatment of contaminated soil, the controlling of such a process is done manually. Manual control is required to regulate the amount of liquid additive that is being added to the contaminated soil. As is known with most manual processes, they are subject to human error which may cause the contaminated soil to be improperly treated, such that the contaminated soil is not properly remediated. When the soil is not properly remediated, it may not pass strict local, state, and/or federal environmental regulations. When this occurs, the soil must be either retreated or removed from the site and replaced with non-contaminated soil. In either case, the inconvenience and expense is considerable.

Therefore, a need exists for a method and apparatus that automatically controls the application of a neutralizing agent to contaminated soil.

DETAILED DESCRIPTION OF A PREFERRED EMBODIMENT

Generally, the present invention provides a method and apparatus for regulating treatment of contaminated soil. This may be accomplished by regulating the soil volume rate and the neutralizing agent volume rate to insure proper application of the neutralizing agent to the contaminated soil. Regulation is achieved through a predetermined soil/neutralizing agent relationship. For example, if it is determined that three gallons of neutralizing agent are needed to treat one ton of contaminated soil properly, the soil/neutralizing agent ratio will be 1 ton:3 gallons. Control circuitry can regulate the soil volume rate and the neutralizing agent volume rate to insure that the appropriate amount of neutralizing agent is applied to the contaminated soil. With such a method and apparatus, the human errors that were possible in the manual procedure are eliminated, thereby insuring that the treated soil, i.e., the contaminated soil treated with the neutralizing agent, will meet or exceed local, state, and/or federal regulatory requirements.

Figure 1:
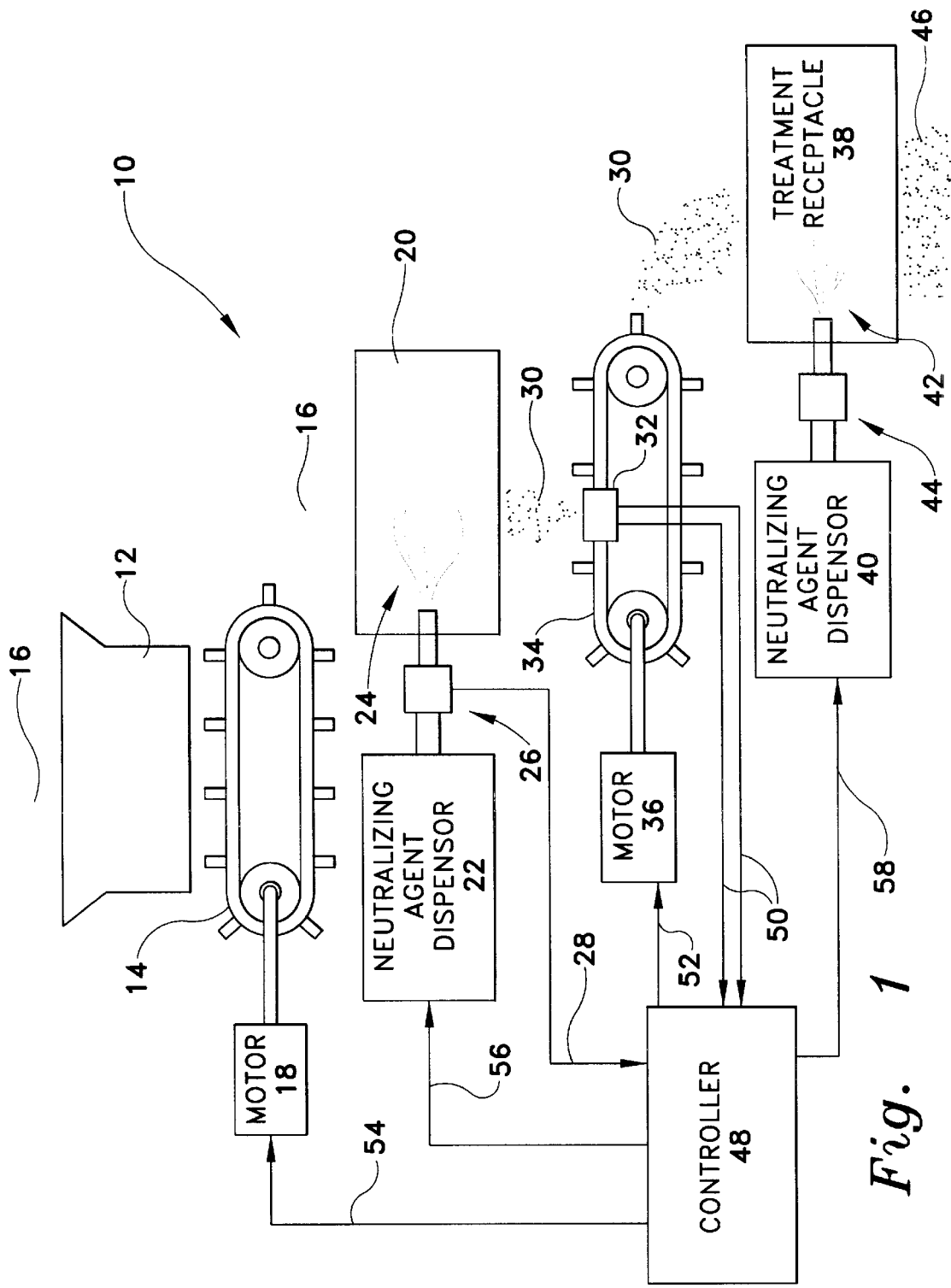
FIG. 1 illustrates a soil treatment apparatus in accordance with the present invention.

The present invention can be more fully described with reference to FIGS. 1–3. FIG. 1 illustrates a soil treatment apparatus 10 that includes a pair of soil dispensers, a pair of neutralizing agent dispensers 22 and 40, and control circuitry. The soil dispenser includes the hopper 12 and conveyor belt 14, while the control circuitry includes controller 48, monitors 26, 44, and monitor 32.

In operation, contaminated soil 16 is placed into hopper 12 and subsequently placed on conveyor 14. The speed of the conveyor 14 is controlled by motor 18. Thus, the volume of the contaminated soil being treated can be regulated by regulating the speed of the conveyor 14 by controlling the motor 18. It should be noted that the hopper 12 is in close proximity to the conveyor 14 such that the volume of soil being placed onto conveyor 14 can be readily and accurately determined.

As the contaminated soil 16 rolls off of conveyor 14, it enters a treatment receptacle 20. Coupled to the treatment receptacle 20 is a neutralizing agent dispenser 22. As the name implies, the neutralizing agent dispenser 22 dispenses a neutralizing agent 24 onto the contaminated soil 16 in the treatment receptacle 20. In practice, the treatment receptacle will be a hammer mill that grinds the contaminated soil into particles of less than one-eighth inch in diameter. Thus, while the treatment receptacle 20 is grinding the contaminated soil 16, it is also mixing in the neutralizing agent 24.

Treated soil 30 departs the treatment receptacle 20 wherein treated soil is the contaminated soil 16 that has been mixed or blended with the neutralizing agent 24. The treated soil then is placed on a second conveyor 34 which deposits the treated soil 30 into a second treatment receptacle 38. Coupled to the second treatment receptacle 38 is a second neutralizing agent dispenser 40 which, like the first neutralizing agent dispenser 22, dispenses a neutralizing agent 42. The second treatment receptacle 38 may also be a hammer mill which grinds the treated soil into smaller particles and mixes in the applied neutralizing agent 42. Having done this, uncontaminated soil 46 departs from the treatment receptacle 38. For the purposes of this discussion, uncontaminated soil 46 shall refer to contaminated soil 16 that has been treated with at least one neutralizing agent such that the soil passes state, local, and/or federal environmental requirements.

As a working example of the soil treatment apparatus 10, assume that the contaminated soil 16 is soil that has been contaminated with gasoline. The soil is placed in the hopper and subsequently mixed in treatment receptacle 20 with a neutralizing agent such as sodium silicate with surfactants. Having mixed the neutralizing agent with the contaminated soil, the process may be stopped at this point. The second conveyor and the second treatment receptacle are optional, depending on the level of contamination of the soil and the desired results. If, for the purposes of this example, the second conveyor and treatment receptacle are utilized, the treated soil, which is the contaminated soil 16 mixed with the neutralizing agent 24, is placed on conveyor 34 and subsequently treated in the second treatment receptacle. The neutralizing agent 42 that may be applied may be the same neutralizing agent 24 or may be a different type of neutralizing agent.

The control circuitry regulates the application of the neutralizing agent 24, 42 to the contaminated soil 16 using a known relationship between the volume of contaminated soil and the volume of neutralizing agent. The controller 48 of the control circuitry regulates the speed of the motors 18 and 36 and also regulates the spraying power of the neutralizing agent dispensers 22 and 40 to insure that the contaminated soil is being treated with the proper amount of neutralizing agent. For example, if the ratio between the neutralizing agent and the contaminated soil is one ton of contaminated soil per three gallons of neutralizing agent, the controller 48 can regulate the speeds of motor 18 and motor 36 via regulated soil volume rate signals 54 and 52, such that the volume of soil entering the treatment receptacles 20 and 38 is of a known volume. Similarly, the controller can regulate, via regulated agent volume rate signals 56 and 58, the neutralizing agent dispensers 22 and 40, such that the amount of neutralizing agents 24 and 42 are in accordance with the predetermined neutralizing agent/contaminated soil ratio.

As shown, the system includes a closed loop feedback system wherein the soil volume rate and the neutralizing agent volume rate are monitored and provided as representative signals to the controller. For example, neutralizing agent monitor 26 monitors the amount of neutralizing agent being applied to the treatment receptacle 20. The monitor 26 then provides a neutralizing agent volume signal 28 to the controller. The controller 48 uses this signal to regulate the speed of the motor and also may use this signal to regulate the dispensing rate of the neutralizing agent dispenser. Likewise, the soil volume monitor 32 monitors the volume amount of soil being treated per any given unit of time and provides soil volume signals 50 to the controller. The controller utilizes these signals to regulate the neutralizing agent dispensers 22 and 40 and may also utilize the signals to regulate motors 18 and 36. Thus, the closed loop feedback system of the soil treatment apparatus 10 regulates both the soil volume rate and the neutralizing agent volume rate to insure that the contaminated soil is being treated with the appropriate amount of neutralizing agent. By insuring that the contaminated soil is being treated with the appropriate amount of neutralizing agent, the resulting uncontaminated soil 46 will be within the regulatory requirements for non-contaminated soil.

Figure 2:
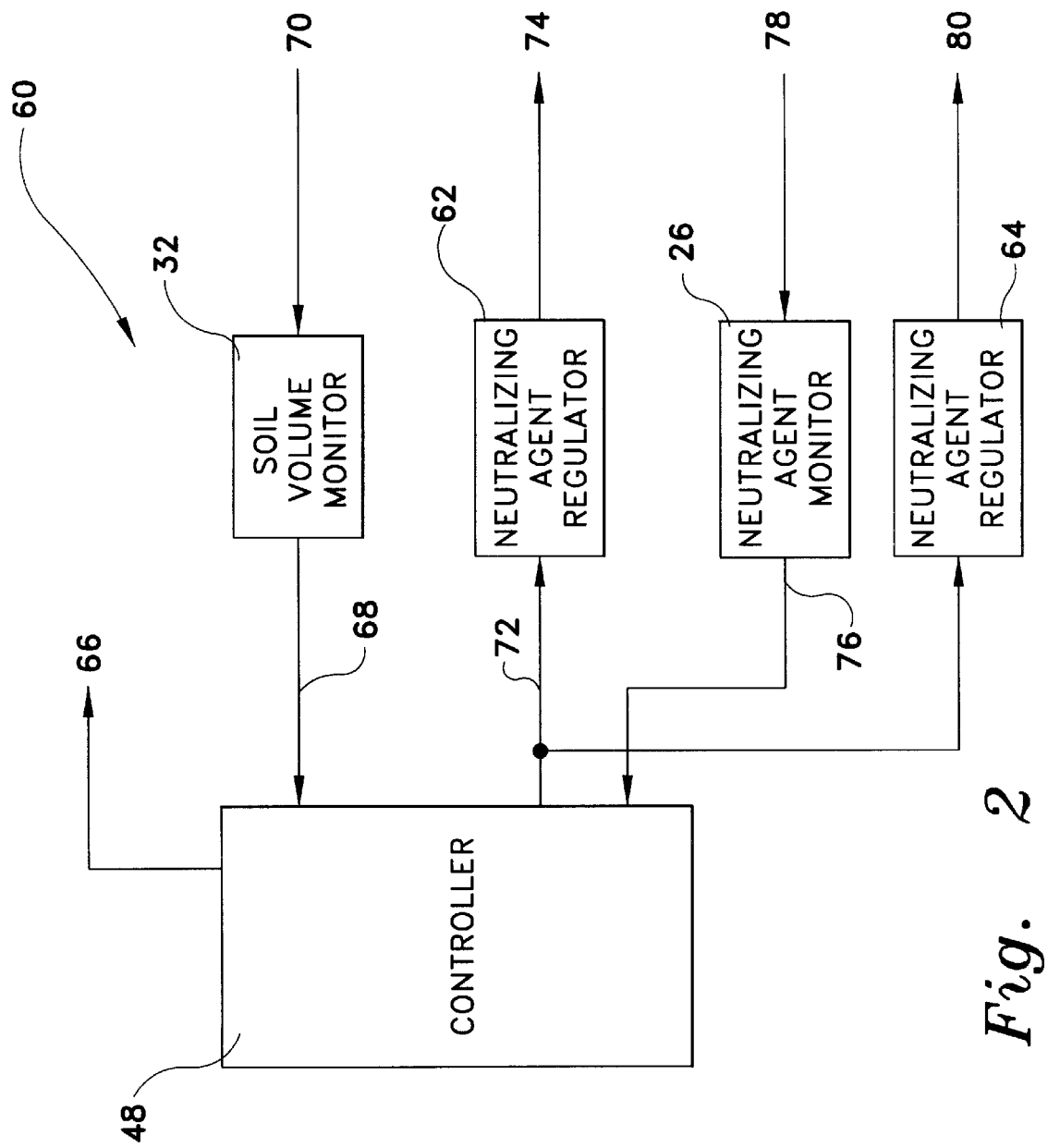
FIG. 2 illustrates a schematic block diagram of control circuitry in accordance with the present invention.

FIG. 2 illustrates a schematic block diagram of the control circuitry of the present invention. As shown, the control circuitry 60 includes a controller 48, a soil volume monitor 32, a neutralizing agent regulator 62, a neutralizing agent monitor 26, and a second neutralizing agent regulator 64. The soil volume monitor 32 and the neutralizing agent monitor 26 provide input signals to the controller 48. For example, the soil volume monitor 32 monitors the soil volume rate 70 and produces a representative soil volume signal 68. Similarly, the neutralizing agent monitor 26 monitors the neutralizing agent volume rate 78 and produces a representative flow rate indicator 76. These input signals are received by the controller, and based on a predetermined ratio of neutralizing agent to soil volume, the controller 48 generates a soil volume rate signal 66 and a flow rate signal 72. The soil volume rate signal 66 may be applied to the motors 18 and 36 (FIG. 1) to regulate the soil volume rate. The flow rate signal 72 is applied to the neutralizing agent regulators 62 and 64. The neutralizing regulators then provide a regulated rate 74 and 80 to regulate the pumping action of the neutralizing agent dispensers 22 and 40 (FIG. 1). This regulation controls the pressure in which the neutralizing agent dispensers dispense the neutralizing agent such that an appropriate amount of neutralizing agent is dispensed.

Figure 3:
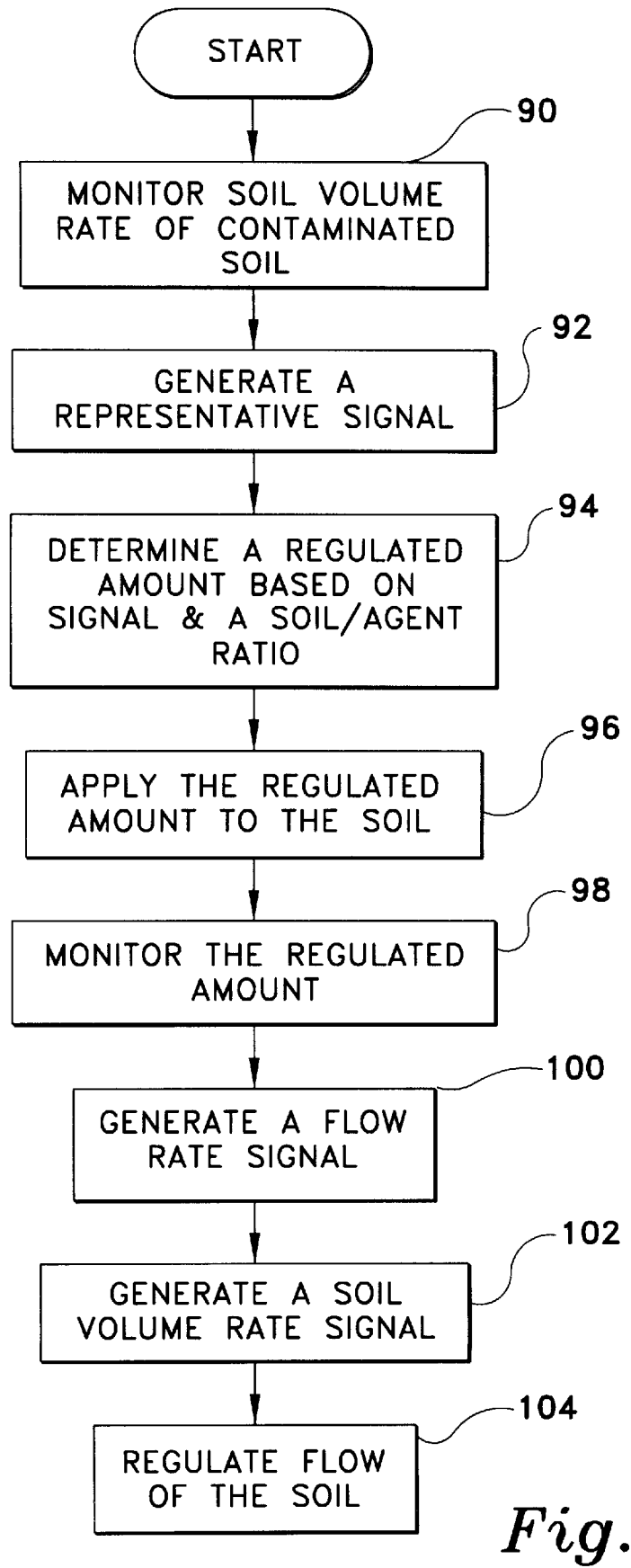
FIG. 3 illustrates a logic diagram that may be used to implement the present invention

FIG. 3 illustrates a logic diagram that may be used to implement the present invention. The steps of FIG. 3 may be implemented in program instructions for execution by a computer or processor. Such programming steps may be stored on any type of digital information storage device such as RAM, ROM, magnetic disk, CD-ROM, magnetic tape, etc. The process begins at step 90 wherein the soil volume rate of the contaminated soil is monitored. From this monitored rate, the process proceeds to step 92 wherein a representative signal of the soil volume rate is generated. The process then proceeds to step 94 wherein, from the representative signal, a regulated amount of neutralizing agent is determined based on the representative signal and a soil/agent ratio. As previously mentioned, the soil/agent ratio is predetermined to insure that an appropriate amount of neutralizing agent is applied to the contaminated soil such that the resulting treated soil is in compliance with local, state, and/or federal environmental requirements.

Having determined the amount of neutralizing agents to be applied, the process proceeds to step 96 wherein the regulated amount of the neutralizing agent is applied to the contaminated soil. At this point, the treated soil may be reinstated into the ground, having insured that it is compliant with governmental regulations. Note that if the bandwidth of the neutralizing agent dispenser is sufficient, steps 90–96 are the only steps needed to insure that the contaminated soil will be properly treated. For the purposes of this discussion, the bandwidth of the neutralizing agent dispenser is defined to be the amount of the neutralizing agent that the neutralizing agent dispenser can dispense. For example, if the soil to neutralizing agent ratio is one ton of soil to three gallons of neutralizing agent, and the soil is being inputted at 30 tons per hour, the neutralizing agent dispenser needs to dispense, or have a bandwidth of, 90 gallons per hour.

Currently, however, the bandwidth of the neutralizing agent dispenser is limited. Thus, the neutralizing agent dispenser has a maximum output capability. For example, if this maximum output capability is 120 gallons per hour, utilizing the one ton to three gallon ratio as described above, the maximum amount of contaminated soil that can be treated within an hour for this particular dispenser is 40 tons. When the neutralizing agent dispenser has reached its maximum bandwidth, the process proceeds to step 98 wherein the regulated amount of the neutralizing agent is determined. From this, at step 100, a flow rate signal is generated. The flow rate signal is used to generate a soil volume rate signal as shown in step 102. The process then proceeds to step 104 wherein the flow rate of the soil is regulated based on the soil volume rate signal. Thus, continuing with the above example, once the neutralizing agent volume dispenser has reached maximum bandwidth, i.e., has reached its maximum dispensing rate, the control circuitry of the present invention regulates the soil volume rate such that the resulting treated soil is compliant with the soil/neutralizing agent ratio. By insuring that the treated soil is in conformity with the soil/neutralizing agent ratio, the resulting treated soil will conform with governmental requirements.

What is claimed is:

1. An apparatus for regulating neutralization of contaminated soil, said apparatus comprising:

a soil dispenser for dispensing contaminated soil at a regulated soil volume rate, said soil dispenser including a hopper and a first conveyor proximate said hopper;

a first motor operably coupled to said first conveyor;

a first treatment receptacle to receive and treat the contaminated soil from said soil dispenser to produce a first treated soil, said first treatment receptacle including means for grinding the contaminated soil into particles;

a first neutralizing agent dispenser coupled to said first treatment receptacle for dispensing a first neutralizing agent at a first regulated agent volume rate;

a first monitor coupled to said first neutralizing agent dispenser for monitoring the first regulated agent volume rate and generating a first agent representative signal;

a second conveyor proximate said first treatment receptacle, said second conveyor including a soil volume monitor for monitoring soil volume rate and generating a soil representative signal;

a second motor operably coupled to said second conveyor;

a second treatment receptacle for receiving and further treating the first treated soil to produce uncontaminated soil;

a second neutralizing agent dispenser coupled to said second treatment receptacle for dispensing a second neutralizing agent at a second regulated agent volume rate;

a second monitor coupled to said second neutralizing agent dispenser for monitoring the second regulated agent volume rate and generating a second agent representative signal; and a controller communicating with said first motor, said second motor, said first monitor, said second monitor, said soil volume rate monitor, said first neutralizing agent dispenser and said second neutralizing agent dispenser, wherein said controller responsive to the soil representative signal, the first agent representative signal and the second agent representative signal controls the regulated soil volume rate, the first regulated agent volume rate and the second regulated agent volume rate.

2. The apparatus according to claim 1 wherein said soil volume monitor comprises a scale operably coupled to said second conveyor.

3. The apparatus according to claim 1 wherein said means for grinding the contaminated soil comprises a first hammer mill.

4. The apparatus according to claim 1 wherein said said second treatment receptacle includes a second hammer mill.

* * * * *